(No Model.)
J. D. SCHAFER.
CAN SOLDERING APPARATUS.
No. 283,821. Patented Aug. 28, 1883.
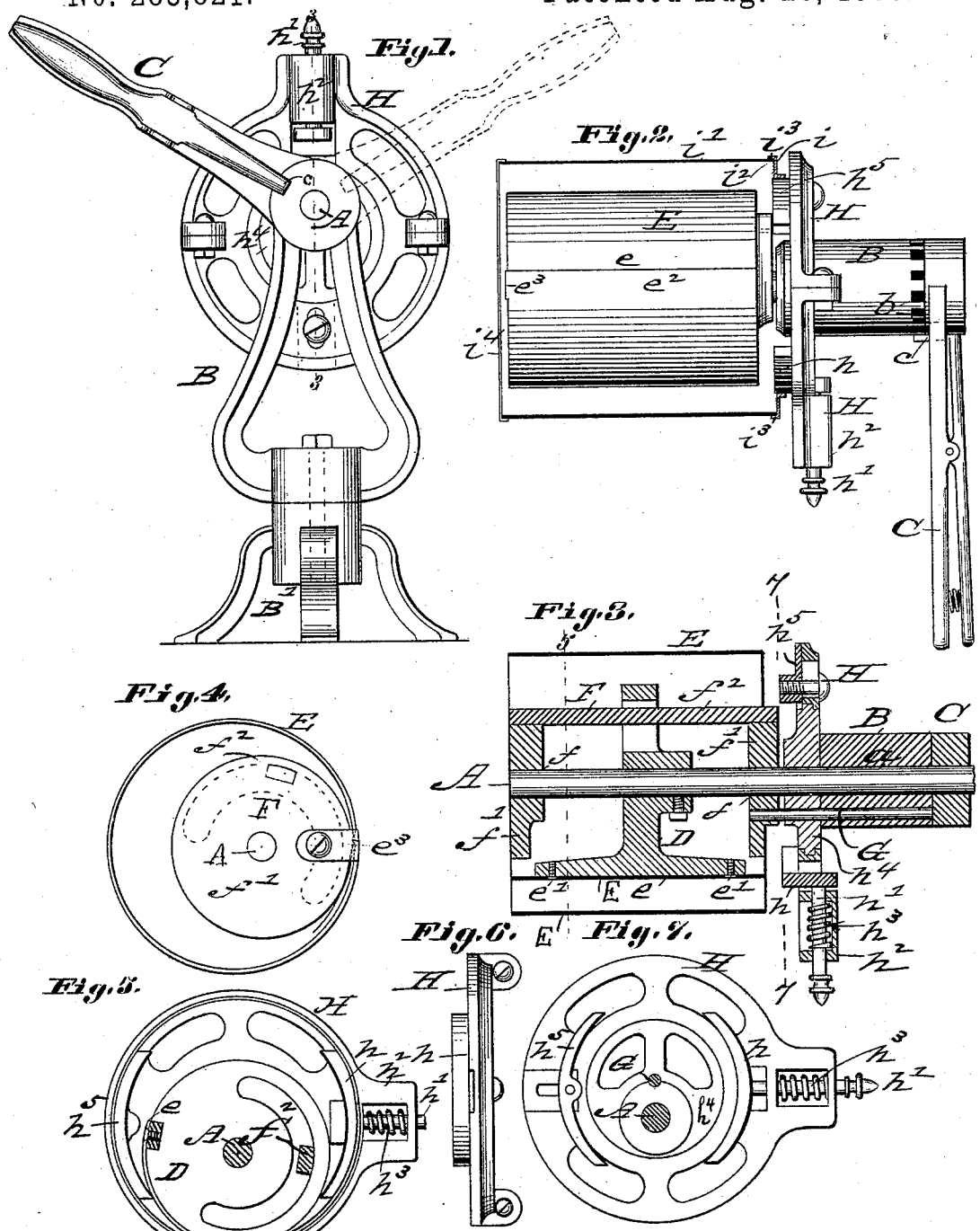
Attest:
Charles Pickles
Frank B. Johnson
Inventor:
Joseph D. Schafer
by C. P. Moody
atty

UNITED STATES PATENT OFFICE.

JOSEPH D. SCHAFER, OF DE SOTO, ASSIGNOR TO THE EXCELSIOR MANUFACTURING COMPANY, OF ST. LOUIS, MISSOURI.

CAN-SOLDERING APPARATUS.

SPECIFICATION forming part of Letters Patent No. 283,821, dated August 28, 1883.

Application filed May 28, 1883. (No model.)

*To all whom it may concern:*

Be it known that I, JOSEPH D. SCHAFER, of De Soto, Missouri, have made a new and useful Improvement in Can-Soldering Apparatuses, of which the following is a full, clear, and exact description, reference being had to the annexed drawings, making part of this specification, in which—

Figure 1 is an end elevation of the machine; Fig. 2, a plan showing a can in section upon the machine; Fig. 3, a longitudinal section; Fig. 4, an end elevation, looking toward the outer end of the parts shown in Fig. 3; Fig. 5, a section on the line 5 5 of Fig. 3; Fig. 6, an edge elevation of the ring that supports the ring at the top of the can, and Fig. 7 a section on the line 7 7 of Fig. 3.

The same letters of reference denote the same parts.

A represents a shaft, journaled at $a$ in an upright, B, and adapted by means of the handle C to be rotated therein.

D represents an arm fastened to the shaft A.

A strip, E, which is preferably made of spring-steel, at one of its ends, $e$, and by means of the screws $e'$ $e'$, is fastened to the arm D. The other end, $e^2$, of the strip is, by means of, say, the ears $e^3$, (but one shown,) fastened to the fixed head F. This head is perforated at $f$ $f$ to admit the shaft A—that is, the head rests upon the shaft, but does not rotate therewith. The head consists, preferably, of the disks $f'$ $f'$, united by the bar $f^2$. A pin, G, projecting from the upright B, through the ring H into the disk $f'$, serves to keep the head F from turning with the shaft A. The strip E in width is preferably nearly equal to the depth of the can being soldered, and in length fully equal, at least, to the circumference of the largest can that can be made on the machine. This strip E, thus supported and connected, forms an expansible mandrel, upon which the body of the can rests during the soldering operation, which is conducted as follows: The mandrel is first reduced to a diameter smaller than that of the collar $i$ of the intended can. This is accomplished by rotating the shaft A and arm D, so as to wind the strip E upon the fixed head F. The rotation of the shaft A is effected, as stated, by means of the handle C, and after the mandrel has been reduced, as desired, it is held from unwinding by means of the spring-dog $c$, which enters one of the notches $b$ in the upright B. The collar $i$ of the can is then passed over the mandrel and hung upon the rest $h$ of the ring H. The body $i'$ of the can is then passed onto the mandrel and its edge $i^2$ made to catch under the flange $i^3$ of the collar $i$. The pieces constituting the body $i'$ are suitably curved before being placed on the mandrel. After the part $i'$ has been connected with the collar $i$, as described, the dog $c$ is detached and the handle C turned backward until the mandrel has expanded to fill the body $i'$. This serves to support the body $i'$. The bottom $i^4$ is then attached, and the soldering is proceeded with. The body-seam may first be soldered, and the body, opposite the body-seam, soldered to the collar $i$ and bottom $i^4$. The handle C is then turned to reduce the mandrel sufficiently to allow of the can being turned around upon the mandrel, and for the purpose of enabling the soldering of the remaining seams to be accomplished. The can is then slipped off the mandrel and the operation repeated. The rest $h$ of the collar-ring H is radially adjustable, the rest being attached to the stem $h'$, which passes through the bearing $h^2$ of the ring and is encircled by the spring $h^3$. This enables the rest to be readily adjusted to the collar $i$, and the collar, when upon the rest, and the body $i'$, to be readily relatively adjusted, so that the edge $i^2$ can be readily made to catch in the collar. The said seat is self-adjusting—that is to say, the spring $h^3$ operates at all times to draw the rest outward or from the center of the ring. The ring H turns upon the bearing or center, $h^4$. The ring H may have another rest, $h^5$, opposite to the rest $h$, and for a similar purpose; and, if desired, it may be made similarly adjustable. The upright B is preferably pivoted in the foot B', to enable the upright to be swung around to present the mandrel in any direction.

The present device is adapted for soldering many other articles as well as cans.

I claim—

1. The combination, in a can-soldering apparatus, of the expansible portion E with the spring-actuated rest $h$ and the ring H, substantially as described.

2. The combination of an expansible portion, E, the shaft A, having its bearing in the upright B, the handle C and its dog c, the arm D, head F, and pin G, substantially as described.

3. The combination, with the upright B and shaft A, of the arm D, the strip E, head F, and the pin G, for connecting the head to the upright B, substantially as described.

4. The combination of the flexible strip E, the head F, and means for holding this head against turning, substantially as described.

Witness my hand this 16th day of May, 1883.

JOSEPH D. SCHAFER.

Witnesses:
C. D. MOODY,
SOLON R. SAPP.